Patented July 4, 1950

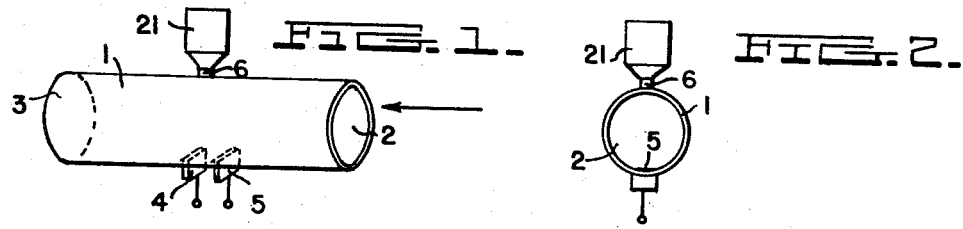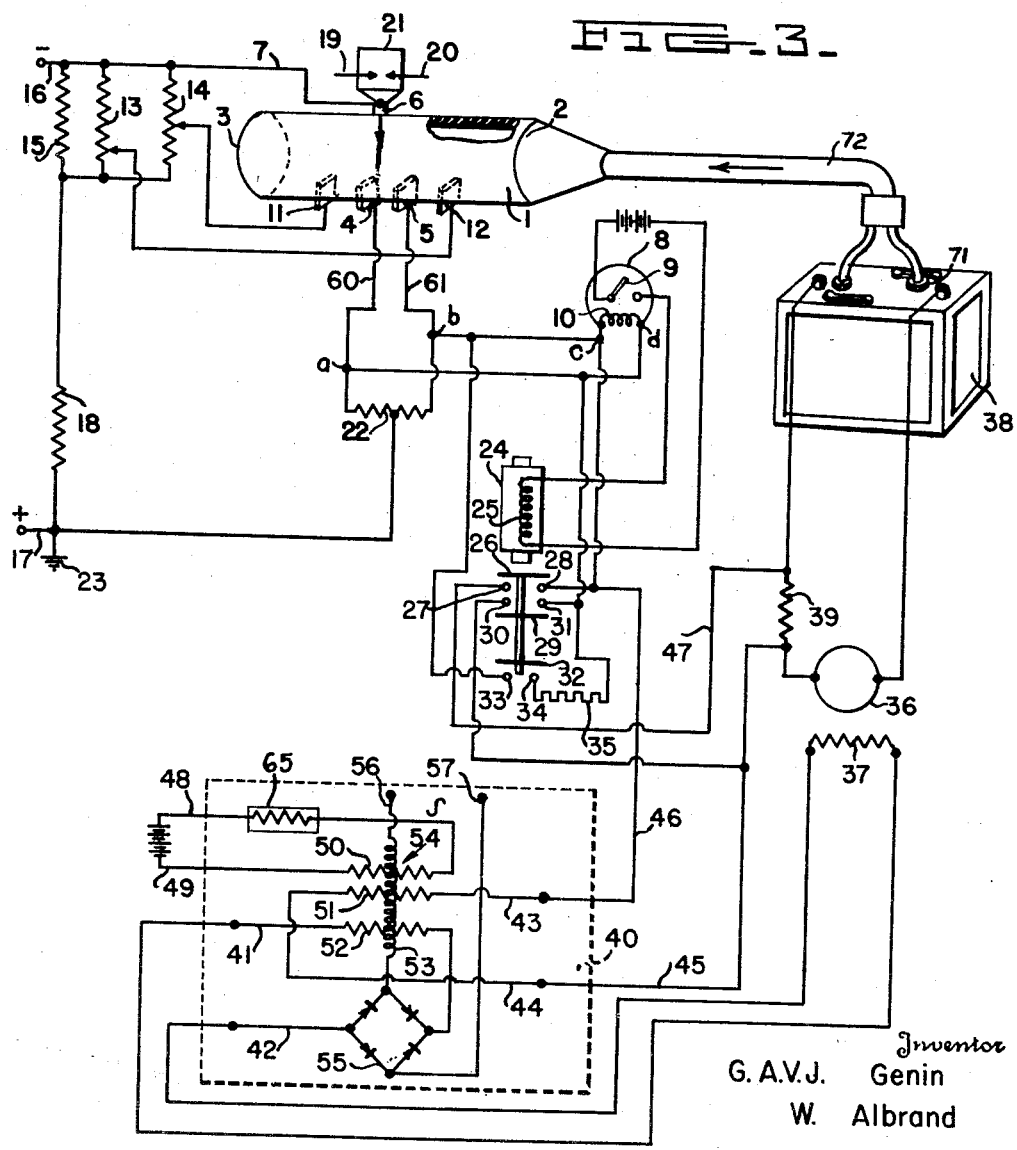

2,514,235

UNITED STATES PATENT OFFICE 2,514,235

SYSTEM FOR CONTROLLING THE CHARGING OF STORAGE BATTERIES

Georges Alexandre Victor Joseph Génin, Nanterre, and Wladimir Albrand, Paris, France, assignors to Compagnie Generale d'Electricite, Paris, France Application October 22, 1947, Serial No. 781,290
In France October 23, 1946

9 Claims. (Cl. 320—46)

Our invention relates to systems for controlling the charging of storage batteries, and in particular to systems for avoiding excessive gassing or evolution of gas at the battery plates during the charging operation.

In the charging of storage batteries, it is important to avoid excessive evolution of gas, both because this involves a waste of energy, and also because it burns the plates.

The usual method of regulating the charging of a storage battery has been by continuously measuring and applying the voltage across the terminals of the battery.

However, the measurement of the terminal voltage does not constitute a reliable criterion for determining the state of charge of a battery. Other factors which must be considered in interpreting and applying the voltage or other measurement are the electrical history of the battery including its age, the extent of contamination of the negative plates, and the existence of small internal short circuits.

Heretofore, the effort has been made to control the charging in accordance with the magnitude of evolution of gas, by collecting the evolved gas and measuring its pressure, but such efforts have not been satisfactory, particularly because of the small volume of the gas involved.

An object of our invention is to provide a system and method for regulating the charging of a storage battery to maintain a constant rate of evolution of gas.

Another object of our invention is to measure the magnitude of a stream of evolved gas by injecting transversely thereof a jet of gaseous ions and continuously electrically measuring the magnitude of the deflection of the jet due to the passage of the gaseous stream.

We provide means for collecting the gas evolved during charging, and cause the gas to flow through a pipe formed of electrical insulating material, and ionically measure the magnitude of the gas stream in the pipe and adjust the battery charging rate in accordance therewith.

We inject a jet of gaseous ions radially into the pipe, and measure the potential difference between two electrodes in the pipe spaced equidistant from the radial plane of injection of the gaseous ions.

We also provide an additional compensatory adjustment of the charging rate to compensate for gas due to extraneous action as local action due to impurities in the battery plates.

Preferably, we regulate the charging operation in two steps, first at constant current, and second, at constant magnitude of evolution of gas.

Our invention will be understood from the following specification and the accompanying drawings wherein like characters of reference represent corresponding elements, and wherein:

Fig. 1 illustrates the principle of measuring the magnitude of gas evolution by the interaction of a jet of gaseous ions with the stream of gas evolved by the battery, as it passes through a pipe;

Fig. 2 shows a cross-section of the gas carrying pipe of Fig. 1, showing the ion injection nozzle, and the ion measuring electrodes; and Fig. 3 is a circuit diagram showing the several parts of the charging control system and their connections.

Generally, we employ the usual type of charging generator and vary its field excitation, as the charging current, or the gassing, varies.

Referring to the drawings in detail, in Fig. 1 there is shown a relatively small pipe or tube 1 formed of electrical insulating material, through there is fed a stream of gas whose magnitude is to be measured. Positioned on one side of the wall of the tube 1 is a nozzle 6 which is mounted to direct radially across tube 1 a jet of gaseous ions supplied from an ionization source 21. The nozzle 6 is preferably metallic. The tip of the nozzle 6 may have a small circular aperture, or it may be a narrow slit perpendicular to the axis of the tube 1. Positioned in the wall of tube 1 substantially diametrically opposite nozzle 6 and spaced equidistant from the radial plane of nozzle 6, are two small metal electrodes 4, 5, having their inner faces substantially flush with the inner wall of tube 1, and having leads 60, 61, differentially connected in an electrical measuring circuit which is also connected to nozzle 6, so that any difference in the potentials of electrodes 4 and 5 is measured and indicated. A suitable source in the measuring circuit maintains electrodes 4, 5 at a positive potential with reference to nozzle 6. If there is no gas stream flowing in pipe 1, equal numbers of gaseous ions from nozzle 6 reach electrodes 4 and 5, and the resultant output voltage in the measuring circuit is zero.

However, if a stream of gas is flowing in pipe 1, its impact on the jet of gaseous ions from nozzle 6, causes some of these gaseous ions to be carried along in the direction of flow of the gas stream, and deviated from their path transversely of the tube 1, and the result will be that the far electrode 4 will receive more ions than near electrode 5, and will build up a higher potential. This will cause an output voltage in the measuring circuit, which can be measured, and can cause actuation of control devices. The gaseous ions may be produced by a spark discharge in chamber 21, as by a spark discharge between the terminals of a spark gap. Such a device can be employed to measure or indicate the presence of a gas stream in the pipe, whether derived from a storage battery charging, or otherwise.

Fig. 3 shows the application of such a gaseous stream measuring device to a storage battery charging system. The storage battery 38 is under charge from a generator 36 through a charging circuit which includes in series a resistor 39. Gases evolved from the cells during charging are collected in vent caps 71 and conducted in a conduit 72 to the insulating measuring tube 1. Provision is made for adjusting the excitation of the field winding 37 of the generator 36, to vary the charging voltage and current in desired manner. The circuit shown in Fig. 3 is arranged to provide two successive controlled steps of the charging operation, the first step being at constant current and continuing up to the time when the constant current causes excessive evolution of gas above a predetermined threshold, and the second step thereafter being at constant magnitude of evolution of gas.

The control unit 40 supplies the field current to field winding 37, and is a current comparison and amplifying unit wherein a relatively small change of control voltage applied to its input terminals 43, 44, causes a relatively large change in the output voltage at output terminals 41, 42, applied to the generator field winding 37. The control unit 40 is so arranged that an increase in the input voltage applied to its input terminals 43, 44 will decrease its output voltage at output terminals 41, 42 which is applied to field winding 37.

A pair of electrodes 4, 5, are positioned in the wall of insulating tube 1 substantially equidistant from the radial plane perpendicular to the axis of pipe 1 which passes through nozzle 6, and substantially in the diametral plane passing through the axis of pipe 1 which passes through nozzle 6. The inner surface of the electrodes 4, 5, is substantially flush with the inner surface of the tube. The two ion receiving electrodes 4, 5, are connected to the respective ends a, b, of a center tapped resistor 22 (Fig. 3), whose center tap is connected at 17 to the positive pole of a D. C. source. The negative pole of this D. C. source is connected at 16 to the metal ion injection nozzle 6. This D. C. source connected at 16, 17, is conveniently of a type to deliver 7000 volt pulses as from a pulse generator. The large resistors 15, 18, damp out surges which may occur and prevent them from reaching tube 1.

The gaseous ion producing chamber 21 may include spark gap electrodes 19 and 20 which may be platinum, and communicate with ion injection nozzle 6. The voltage applied across electrodes 19 and 20 may be 2500 volts D. C. if gas channel 1 has a diameter of 12 mm., and may be 3000 volts D. C. if gas channel 1 has a diameter of 20 mm. Other devices for producing gaseous ions may be employed.

If it is desired to control the charging rate at all times in accordance with the magnitude of gas evolution, the terminal points a, b, of resistor 22 which are connected to electrodes 4, 5, may be connected directly to the input terminals 43, 44, of control unit 40.

However, if it is desired to provide two successive different steps of regulation, the first at constant charging current, and the second at constant gas evolution, there may be provided the circuit arrangement shown in Fig. 3 having a relay 24 having sets of controlled contacts connected to selectively connect to the input terminals of control unit 40, either the terminals of series resistor 39 in the charging circuits, or the terminals a, b, of resistor 22, according as to whether the actuating winding 25 of relay 24 is unenergized or energized.

A contact galvanometer or electromagnetic switch 8 has an actuating winding 10 connected across terminal points a, b, of resistor 22, and has a controlled contact 9 connected to close a supply circuit of relay actuating winding 25 from a D. C. source 7, when a potential difference of sufficient magnitude exists between points a and b. The contact galvanometer 8 comprises adjusting means such as a conventional variable shunt by which adjustment may be made of the magnitude of the potential difference between points a and b which is required to close contact 9 and energize the relay winding 25.

When relay 24 is not energized, its controlled top contacts 27, 28, are bridged by blade 26, and at the same time bridge 29 is spaced from contacts 30, 31, and blade 32 bridges contacts 33, 34. This results in connecting the terminals of series resistor 39 direct to the input terminals 43, 44 of control unit 40, and thereby applying to the input of control unit 40 a voltage proportional to the charging current flowing in the main charging circuit of the battery. When relay 24 is not energized, a resistor 35 is connected across points a, b, through bridging blade 32 and is in parallel with winding 10 of galvanometer 8.

When relay 24 is energized, bridging blades 26 and 32 are pulled away from their contacts, and blade 29 is pulled into engagement with the contacts 30, 31, thus opening the circuit from resistor 39 to the input terminals 43, 44 of control unit 40, and disconnecting resistor 35, and connecting points a, b, to input terminals 43, 44 of control unit 40, so that the field excitation of generator 36 is varied in accordance with the magnitude of the potential difference between electrodes 4 and 5, the excitation decreasing as the evolved gas flow increases.

The control unit 40 may assume any one of various forms, of which one suitable arrangement is shown in Fig. 3, and consists of a multi-winding transformer or reactor arrangement comprising a primary winding 51 connected to input terminals 43, 44, and being in mutual inductive relation with a secondary winding 52 and with a current comparison winding 50 and a power supply winding 53. The secondary winding 52 is connected through two corners of a rectifier bridge 55 to the output terminals 41, 42 of control unit 40, and these output terminals are connected to field winding 37 of the charging generator. The other two corners of rectifier bridge 55 are connected through power supply transformer winding 53 to an A. C. power supply 56, 57, which may be of commercial frequency and voltage. The comparison winding 50 is connected through a resistance such as an iron-hydrogen resistance 65 to terminals 48, 49 to which is applied a D. C. potential which may be from the battery under charge, and winding 50 is traversed by a substantially constant current which causes partial magnetic saturation. Control unit 40 is preferably of the saturable core reactor type of direct current excited inductive reactor, composed of the several windings as shown, wound on a closed three-leg type of laminated iron transformer core frame and preferably having the alternating current winding 51 split and wound on the two outer legs, and the several direct current windings wound on the middle leg. Other arrangements to control the magnitude of the field excitation of field winding 37 by the voltage across input terminals 43, 44, may be employed to decrease the excitation as the input voltage increases, and vice versa.

The value of the resistance 35 should be chosen so as to be substantially equal to the resistance of primary winding 51, so that the same value of resistance is at all times shunted across winding 10 of galvanometer 8.

Instead of the rectifier bridge 55, other usual rectifying arrangements may be used.

At the beginning of the charging operation, when relay 24 is not energized, the field excitation of field winding 37 is maintained by control unit 40 at a value such as to maintain a constant charging current.

As the charging operation proceeds, a time is reached when this constant value of current produces excessive gassing, sufficient to produce a potential difference $a$, $b$, large enough to cause galvanometer 8 to actuate relay 24, whereupon for resistor 35 there is substituted the equivalent resistance of primary winding 51, and the potential difference $a$, $b$, is applied to input terminals 43, 44 of control unit 40, which causes the field excitation to be thereafter controlled in accordance with the magnitude of the evolved gases from the charging operation.

It may be desired to adjust the zero value of the magnitude of gas evolution for which the electrodes give the actuating value of potential difference, as may be desired for instance to avoid the effect on the operation of a portion of the gas stream passing through the tube which may be due to some cause other than the magnitude of the charging current, such, for instance, as local action due to impurities in the battery plates. This can be accomplished by inserting in the wall of the tube 1, an auxiliary pair of auxiliary electrodes 11, 12, substantially equally spaced on opposite sides of the pair of principal electrodes 4, 5, and by applying between auxiliary electrodes 11, 12, a suitable potential difference with reference to nozzle 6, which may be derived from adjustable potentiometers 13, 14 connected across a resistor 15 which is connected to a suitable D. C. supply source. This will result in pulling a certain number of ions away from principal electrodes 4, 5, and thereby adjust the zero of the gaseous ion response arrangement, and compensate for the portion of the gaseous stream due to extraneous causes such as local action.

It will be apparent to those skilled in the art that our invention is susceptible of modifications to meet particular conditions, and all such modifications which are within the scope of the appended claims we consider to be comprehended within the spirit of our invention.

What is claimed is:

1. In a gassing controlled storage battery charging system, a storage battery, a charging circuit comprising a charging generator connected for charging said battery, current varying means comprised in said charging circuit for varying the magnitude of the charging current delivered to said battery, control means for controlling the action of said current varying means, gas collecting means for collecting the gas evolved during the charging of said storage battery, a gas flow measurement pipe formed of electrical insulating material and being connected at one of its ends to said gas collecting means, and at its other end being open to the atmosphere, means for introducing in determined quantity gaseous ions into the stream of battery evolved gases passing through said pipe, electrical measuring means applied to said pipe for measuring as a derived voltage the number of said gaseous ions reaching particular areas of said pipe as determined by the impact of said stream of evolved gas on said gaseous ions, and means for applying said so derived measured voltage to said control means for controlling the charging current of said battery in accordance with the magnitude of the gases evolved from the charging operation.

2. In a gassing controlled storage battery charging system, a storage battery, a charging circuit comprising a charging generator connected for charging said battery, current varying means comprised in said charging circuit for varying the magnitude of the charging current delivered to said battery, control means for controlling the action of said current varying means, gas collecting means for collecting the gas evolved during the charging of said storage battery, a gas flow measurement pipe formed of electrical insulating material and being connected at one of its ends to said gas collecting means, and at its other end being open to the atmosphere, a source of gaseous ions positioned outside said pipe, inlet means in the wall of said pipe connected to said ion source and adapted to deliver a jet of gaseous ions into said pipe transversely thereof, a pair of electrodes positioned in the wall of said pipe equidistant from the point of impact of said jet on the wall opposite said inlet means, means for applying to said electrodes a positive potential with reference to said inlet means, electrical measuring means connected to said electrodes for measuring the potential difference between said two electrodes as determined by the number of said gaseous ions respectively reaching said electrodes and as determined by the impact of said stream of evolved gas on said jet of gaseous ions, and means for applying said so measured potential difference to said control means for controlling the charging current of said battery in accordance with the magnitude of the gases evolved from the charging operation.

3. In a gassing controlled storage battery charging system, a storage battery, a charging circuit comprising a charging generator connected for charging said battery, current varying means comprised in said charging circuit for varying the magnitude of the charging current delivered to said battery, control means for controlling the action of said current varying means, gas collecting means for collecting the gas evolved during the charging of said storage battery, a gas flow measurement pipe formed of electrical insulating material and being connected at one of its ends to said gas collecting means and at its other end being open to the atmosphere, a source of gaseous ions positioned outside said pipe, inlet means in the wall of said pipe connected to said ion source and adapted to deliver a jet of gaseous ions into said pipe radially substantially perpendicularly to the axis of said pipe, a pair of principal electrodes positioned in the wall of said pipe substantially equidistant from the plane perpendicular to the axis of said pipe and passing through said inlet means, said electrodes being substantially in the diametral plane of said pipe passing through said inlet means, means for applying to said electrodes a positive potential with reference to said inlet means, electrical means connected to said electrodes for measuring the potential difference between said two electrodes as determined by the number of said gaseous ions respectively reaching said electrodes and as determined by the impact of said stream of evolved gas on said jet of gaseous ions for applying said so measured potential difference to said control means for controlling the charging current of said battery in accordance with the magnitude of the gases evolved from the charging operation.

4. A system according to claim 2, and means for deriving a voltage proportional to the magnitude of the varying current flowing in said charging circuit, relay means adapted when unactuated to apply to said control means said voltage proportional to said charging current and when actuated to apply to said control means said potential difference between said two electrodes, and a liminal voltage responsive electromagnetic switch having its actuating winding connected for actuation by said potential difference between said electrodes and having its controlled contacts connected for energizing the winding of said relay means when said potential difference attains a liminal value, whereby the rate of charging said battery is determined by the magnitude of the charging current prior to the attainment of said liminal value of said charging current, and is determined by the magnitude of the evolved gases after the attainment of said liminal value in such manner as to tend to reduce the charging rate as the magnitude of the evolved gases increases.

5. A system according to claim 3, and an auxiliary pair of auxiliary electrodes mounted in the wall of said pipe respectively on opposite sides of said pair of principal electrodes, longitudinally of said pipe, and means for maintaining a potential difference between said auxiliary electrodes for adjusting the zero of ion response and compensating for the portion of the stream of evolved gases which is independent of charging rate.

6. The method of regulating the rate of storage battery charging to avoid excessive gassing, which consists in collecting into a stream the gases evolved during charging, injecting into said stream a jet of gaseous ions substantially perpendicularly to the axis of said stream, then discharging said stream into the open atmosphere, electrically measuring the potential difference between two points in the periphery of said stream equidistant from the plane perpendicular to the axis of said stream which plane passes through said jet and which points are substantially opposite the point of injection of said jet, and adjusting the charging voltage applied to said battery in accordance with said potential difference.

7. In a device for measuring the magnitude of a stream of gas, a pipe formed of electrical insulating material and adapted to carry said stream of gas, a source of gaseous ions, electrically conducting inlet means positioned in the wall of said pipe and connected and adapted to inject a jet of gaseous ions from said source substantially perpendicularly to the axis of said pipe, a pair of principal electrodes positioned in the wall of said pipe substantially equidistant from the plane perpendicular to the axis of said pipe which passes through said inlet means and said electrodes being also positioned substantially in the diametral plane of said pipe which passes through the axis of said pipe and said inlet means, means for applying to said electrodes a potential positive with respect to said inlet means, and electrical measuring means for measuring the potential difference between said electrodes as a measure of the magnitude of the gas stream impact on said jet of ions.

8. A device according to claim 7, and an auxiliary pair of auxiliary electrodes positioned in the wall of said pipe respectively on opposite sides of said pair of principal electrodes longitudinally of said pipe, and means for applying a potential difference to said auxiliary electrodes for varying the zero setting of said device and compensating for the portion of the gaseous stream whose magnitude is not to be measured.

9. The method of measuring the magnitude of a defined collected stream of gas which consists in injecting into said stream a jet of electrically charged gaseous ions substantially perpendicularly to the axis of said stream, and electrically measuring the potential difference between two points in the periphery of said stream equidistant from the plane perpendicular to the axis of said stream which plane passes through said jet and which points are substantially opposite the point of injection of said jet.

GEORGES ALEXANDRE VICTOR
JOSEPH GÉNIN.
WLADIMIR ALBRAND.

REFERENCES CITED

The following references are of record in the file of this patent:

UNITED STATES PATENTS

| Number | Name | Date |
|---|---|---|
| 550,242 | Biddle | Nov. 26, 1895 |
| 1,034,108 | Halbleib | July 30, 1912 |
| 1,411,796 | Meyer | Apr. 4, 1922 |
| 1,605,020 | Woodbridge | Nov. 2, 1926 |
| 1,808,709 | Blake | June 2, 1931 |
| 1,881,543 | Hartig et al. | Oct. 11, 1932 |
| 2,015,933 | Hartig | Oct. 1, 1935 |
| 2,149,847 | Kolin | Mar. 7, 1939 |
| 2,151,203 | Hartig | Mar. 21, 1939 |
| 2,274,262 | Wolff | Feb. 24, 1942 |
| 2,315,805 | Mayo et al. | Apr. 6, 1943 |

FOREIGN PATENTS

| Number | Country | Date |
|---|---|---|
| 333,625 | Great Britain | Aug. 18, 1930 |
| 520,484 | Germany | Mar. 23, 1931 |